Figure 1A:
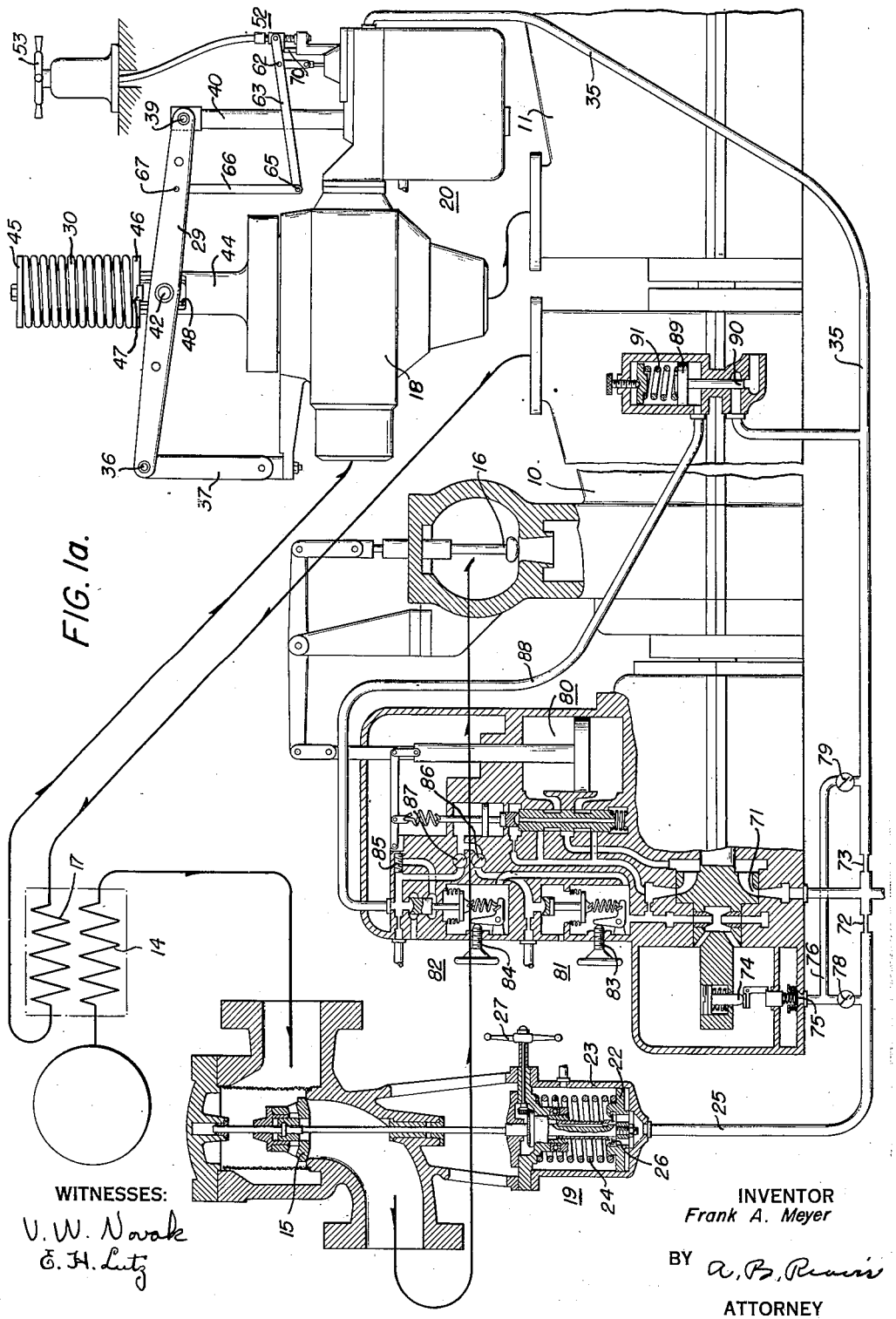

Feb. 19, 1952           F. A. MEYER           2,586,688
AUTOMATICALLY AND MANUALLY CONTROLLED SERVOMOTOR FOR
INTERCEPTOR VALVE OF TURBINE AND REHEATER APPARATUS
Filed Nov. 16, 1948           2 SHEETS—SHEET 1

WITNESSES:
U. W. Novak
E. H. Lutz

INVENTOR
Frank A. Meyer
BY
ATTORNEY

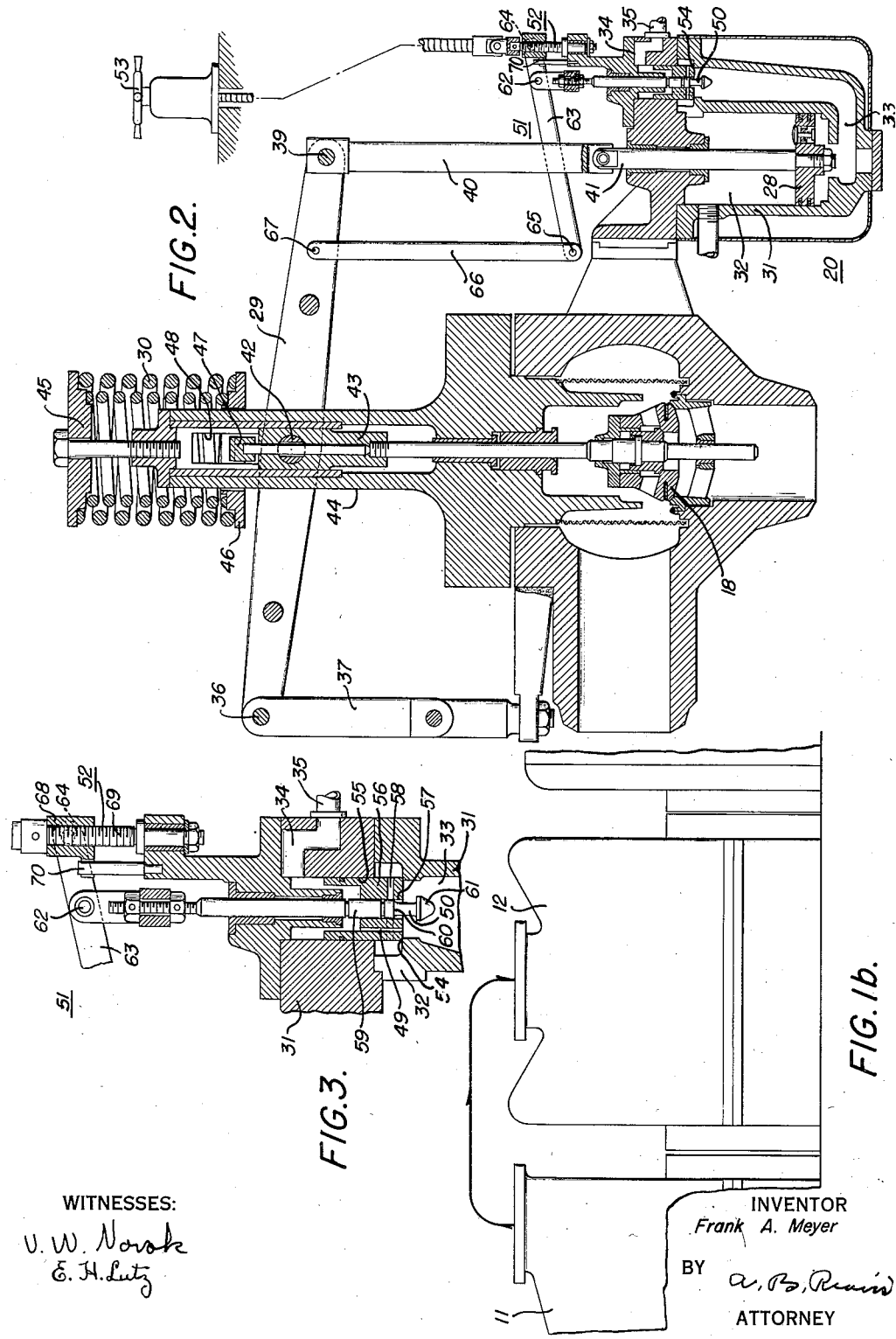

Patented Feb. 19, 1952

2,586,688

UNITED STATES PATENT OFFICE 2,586,688

AUTOMATICALLY AND MANUALLY CONTROLLED SERVOMOTOR FOR INTERCEPTOR VALVE OF TURBINE AND REHEATER APPARATUS

Frank A. Meyer, Sharon Hill, Pa., assignor to Westinghouse Electric Corporation, East Pittsburgh, Pa., a corporation of Pennsylvania Application November 16, 1948, Serial No. 60,278

3 Claims. (Cl. 121—41)

The invention relates to a hydraulic servo-motor for operating a valve and wherein the latter is positioned with opposed forces of spring means and of a piston, having pressure applied thereto, acting thereon in balanced relation, and it has for an object to provide apparatus of this character with means operative to disturb the balanced relation of forces and which is operated in a follow-up manner in consequence of valve movement to restore the balanced relation of forces.

Another object of the invention is to provide apparatus of the above character with a manually-operable device for adjusting the follow-up arrangement to initiate operation of the servo-motor to move the valve and to determine the extent of opening of the valve.

A further object of the invention is to provide apparatus of the above character with means responsive to fall in supply pressure to bring about rapid closing of the valve.

In Bryant Patents No. 2,504,640, and No. 2,514,931, there are disclosed systems for controlling the throttle, governing and intercepting valves of a reheat turbine installation. The present invention is concerned with an improved hydraulic servo-motor for operating the interceptor valve. Normally, the servo-motor is supplied with liquid under pressure to open the interceptor valve to a desired extent; however, in the event of fall in supplied pressure, due to operation of the emergency governor or to the auxiliary governor assuming control of the turbine, the servo-motor is effective to bring about rapid closing of the interceptor valve to interrupt the flow of reheated steam to the turbine, the reheater preferably then being supplied with saturated steam, which, prior to discharge, absorbs heat therefrom to prevent overheating, as more particularly disclosed in the second application of Bryant aforesaid. In accordance with the present invention, the servo-motor includes a piston for moving the interceptor valve in an opening direction against the force of spring means. An operating cylinder cooperates with the piston to provide drain and operating pressure spaces at opposite sides of the latter, with the operating pressure space at the side required for opening of the interceptor valve. A discharge valve is moved by interceptor valve follow-up means to control communication of the operating pressure space with the drain space so that opening movement of the interceptor valve is terminated when the opening force exerted by the piston on the interceptor valve balances the closing force of the spring means acting thereon, variation in operating pressure being possible due to the fact that liquid is supplied to said space from the pressure supply space through an orifice. The follow-up means is manually adjustable to move the discharge valve and thereby to disturb the balanced relation of forces acting on the interceptor valve to cause the latter to move until consequent movement of the discharge valve by the follow-up means restores the balanced relationship of forces. In addition to the restricted or controlled communication of the operating pressure space with the drain space through the discharge valve, there is provided a normally-closed valve which opens upon fall in supply pressure to place the operating pressure space in communication with the drain space for rapid closing of the interceptor valve by its spring means.

A more particular object of the invention is to provide a servo-motor having these advantageous features of construction and of operation.

The foregoing and other objects are effected by my invention as will be apparent from the following description and claims taken in connection with the accompanying drawings, forming a part of this application, in which:

Figs. 1a and 1b together show a reheater turbine arrangement with the control system largely illustrated in section;

Fig. 2 is an enlarged detail view of the interceptor valve and its improved servo-motor; and Fig. 3 is a sectional detail view showing the discharge and escape valves of the interceptor valve servo-motor.

In the drawings, there is shown a turbine installation having a high-pressure section 10, an intermediate-pressure section 11, and a low-pressure section 12. Steam from a superheater 14 flows through the throttle valve 15 and the governor valve 16 to the high-pressure section 10, and steam exhausting from the latter normally flows through the reheater 17 and then is returned, through the interceptor valve 18, to the intermediate-pressure section 11 for flow through the latter and the low-pressure section 12 in series.

The throttle valve 15 and the interceptor valve 18 are operated by manually-controllable servomotors, at 19 and 20, respectively, both of which operate to close the throttle and interceptor valves when a predetermined overspeed is reached, and the servo-motor, at 20, being also responsive to governing operation at a speed higher than normal but below said predetermined overspeed to close the interceptor valve, The throttle valve servo-motor, at 19, is of a conventional type, it including a piston 22 in the cylinder 23 and connected to the throttle valve 15, a spring 24 exerting force on the piston to close the valve, means including a conduit 25 for supplying liquid under pressure to the cylinder to move the piston 22 against the spring to open the valve, a pilot valve 26 movable axially of the cylinder and relative to the piston by operation of the handwheel 27 so that pressure acting on the piston is modified to cause the latter to follow the pilot valve. Whenever the pressure supplied by the pipe 25 drops for any reason, such as in response to a predetermined overspeed, the spring 24 rapidly closes the throttle valve.

Then interceptor valve servo-motor, at 20, includes a piston 28, connected with the interceptor valve 18 by means including a lever 29, spring means 30 closing the interceptor valve and moving the piston in a valve-closing direction, and a cylinder 31 cooperating with the piston to define drain and operating pressure spaces 32 and 33 at opposite sides thereof and to provide a pressure supply space 34 supplied with liquid under pressure by the pipe 35 in which the pressure is reduced to close the interceptor valve in response to tripping by the emergency governor or to the auxiliary governor taking control at a speed above rated speed but below the emergency tripping speed as more particularly disclosed and claimed in the aforesaid Patent No. 2,504,640 of Bryant.

The lever 29 has one end fulcrumed, at 36, to the link 37 carried by the valve housing structure, has its other end pivotally connected, at 39, to the link 40, which is pivotally connected to the piston rod 41, and it is pivotally connected, at 42, to the interceptor valve stem structure 43. As shown, the valve housing has a tubular extension 44 telescopically arranged with respect to and extending above the stem structure 43. The upper end of the tubular extension is connected to an adjustable abutment 45 for the upper end of the spring means 30 and the lower end of the latter engages an abutment 46 provided with a cross bar 47 extending through opposed slots 48—48 of the tubular extension and bearing on the upper end of the stem structure. Thus, the spring means 30 acts directly on the stem structure to close the interceptor valve and through the lever 29 to move the operating piston in a valve-closing direction.

To open the interceptor valve against the force of the spring means 30, pressure of liquid in the operating pressure space 33 is increased. The means for this purpose comprises an orifice 49 connecting the pressure supply space 34 with the operating pressure space 33 and a variable discharge valve 50 controlling communication of the latter space with the drain space 32. Pressure in the operating pressure space is controlled by the discharge valve 50 movable to place the operating pressure and drain spaces in communication and to interrupt such communication. The valve 50 is connected, through follow-up means, at 51, with the interceptor valve 18 so that disturbance of the balanced relation of forces acting on the interceptor valve brings about movement of the latter and operation of the discharge valve to alter the operating pressure space pressure to restore the balanced relation of forces to terminate interceptor valve movement. The follow-up means, at 51, is provided with manually operable adjusting means, at 52, having an operating handwheel 53.

Describing the portion of the servo-motor shown in Fig. 3 in greater detail, the operating cylinder 31 embodies a valve cylinder 55 communicating with the operating pressure space 33, drain space 32 and pressure supply space 34. Mounted within the cylinder 55 is a piston 56 having formed thereon an escape valve portion 54, which is engageable with a suitable valve seat to control communication between the operating pressure space 33 and the drain space 32. The escape valve 54 thus arranged between the operating pressure space 33 and drain space 32 is normally closed and is adapted to open when fluid pressure acting on the end of piston 56 exposed to supply space 34 exceeds the pressure in space 33, to bring about rapid closing of the interceptor valve 18 by the spring means 30, shown in Fig. 2. The piston 56 has formed therein the orifice 49 connecting the pressure supply and operating spaces 34 and 33. The piston 56 has a coaxial bore 57 open through its lower end and connected by port 58 to the drain space 32. The valve 50 is shown as being of the piston type and has a lower piston portion 60 which covers and uncovers the port 58 to interrupt and establish communication between the operating pressure space 33 and drain space 32. Preferably, the piston valve 59 has a head 61 for moving the piston 56 in the event of sticking of the latter.

Assuming that the interceptor valve is closed with the discharge valve 50 open, that is, with the piston portion 60 disposed to uncover port 58, and that it is desired to open the interceptor valve, the handwheel 53 is turned to move the discharge valve 50 downwardly relative to the piston 56, thereby causing piston portion 60 to close port 58. Continued flow of oil through orifice 49 then causes the operating pressure space pressure to increase to open the interceptor valve, and such opening movement is transmitted, through the follow-up mechanism 51, to the discharge valve 50 for follow-up motion of the latter to effect sufficient flow of oil through port 58 to re-establish the balanced relation of forces acting on the interceptor valve, whereby the extent of opening movement of the latter depends upon the extent of movement of the manually operable means, at 52.

The servo-motor 20 is also adapted for automatic response to a reduction in pressure in the supply pipe 35, due either to operation of the emergency governor or to operation of the auxiliary governor, as hereinafter described. As the upper end of the piston 56 is exposed to supply pressure and its lower end is exposed to operating pressure space pressure and as the supply pressure is normally higher than the operating pressure space pressure, the piston 56 is positioned to close the valve 54 to interrupt communication between the operating pressure and drain spaces; however, upon fall in supply pressure, the higher pressure, exerted by the operating pressure space liquid on the lower face of the piston and due to the force of the spring means 30 applied through the piston 28 to such liquid, forces upward movement of the piston 56, thereby establishing free communication of the operating pressure and drain spaces, in consequence of which the spring means 30 is effective to move the interceptor valve rapidly in a closing direction.

The upper end of the valve piston 59 is preferably connected, at 62, to the follow-up lever 63 having one end carried by the fulcrum 64 and its other end pivotally connected, at 65, to a link 66, which, in turn, is pivotally connected, at 67, to the lever 29.

The fulcrum block or cross head 68 is threaded to a stem 69 rotatably carried by the servo-motor cylinder and held against rotation by any suitable guide means 70. The stem is rotated by the handwheel 53.

Liquid under pressure is supplied by the impeller 71 through orifices 72 and 73 to the pipes 25 and 35. An emergency governor 74 is responsive to a predetermined turbine overspeed to trip open the valve 75 to release the pressure in the piping 76 connected through check valves 78 and 79, respectively, to the pipe 25 enclosing a part of the throttle valve pressure space and to the pipe 35 forming a part of the supply pressure space of the interceptor valve servo-motor. With opening of the valve 75 in response to a predetermined overspeed and with the check valves both arranged to open for flow from the pipes 25 and 35 to the open valve 75, both the throttle and the interceptor valves are closed. On the other hand, pressure in the line 35 may be released to close the interceptor valve without influencing the throttle valve.

The governor valve 16 is operated by a servo-motor 80 controlled by the main and auxiliary governors 81 and 82, respectively, provided with speed changers 83 and 84, and the auxiliary governor has a speed compensator 85, all as more particularly disclosed and claimed in the Bryant Patent No. 2,504,640.

With the auxiliary governor set for a slightly higher speed than the main governor, if there is a sudden drop in load, instead of the turbine overspeeding excessively and possibly to the point of tripping the emergency governor valve, the auxiliary governor takes over control of the turbine, the check valves 86 and 87 assuring that whichever governor 81 or 82 delivers the higher pressure to the servo-motor, at 80, controls operation of the latter.

Auxiliary governor pressure is furnished by the pipe 88 for action on the piston 89 of the trip valve 90, and, upon such pressure overcoming loading of the spring 91, the trip valve opens to release the pressure in the interceptor valve servo-motor supply pressure pipe 35, whereupon the spring means 30 is effective to close the interceptor valve.

From the foregoing, it will be apparent that I have devised a hydraulic servo-motor for operating an interceptor valve and having follow-up apparatus provided with means manually operable to initiate operation of the servo-motor and to control extent of such operation and wherein such follow-up apparatus operates in response either to operation of the emergency governor or to the auxiliary governor taking control of the turbine to render the servo-motor effective to close the interceptor valve.

While I have shown my invention in but one form, it will be obvious to those skilled in the art that it is not so limited, but is susceptible of various changes and modifications without departing from the spirit thereof.

What I claim is:

1. In a servo-motor for operating a main valve and comprising a main valve operating member, spring means acting on the operating member in a main-valve-closing direction, an operating piston, linkage means connecting the operating piston and the operating member, an operating cylinder for the piston and cooperating with the latter to provide pressure and drain spaces at opposite sides thereof with the pressure space at the side for pressure therein to move the piston for moving said operating member in a main-valve-opening direction against the spring means, means including an orifice for supplying liquid under pressure to said operating pressure space, a discharged valve movable to place the operating pressure and drain spaces in communication and to interrupt such communication, follow-up means connecting the linkage means and the discharge valve and operative to provide for liquid under operating pressure acting on the operating piston to move the latter to move the operating member in the main-valve-opening direction against the force of the spring means until discharge of liquid from said operating pressure space reaches a value such that the force of the operating piston acting on the main valve operating member balances that of the spring means acting thereon, an escape valve between said operating pressure and drain spaces, manual means for adjusting the follow-up means to initiate movement of the discharge valve to alter the balanced relation of forces applied to the main valve operating member to move the latter with movement thereby, through the follow-up means, of the discharge valve until the balanced relation of forces acting on the main valve operating members is restored, and means for moving the escape valve to place the operating pressure and drain spaces in communication and to interrupt such communication and comprising opposed pressure areas provided thereon with one of the areas subject to pressure of liquid supplied to the orifice and the other thereof subject to pressure of liquid in the operating pressure space and the areas having such relation that, as long as the supply pressure is higher than the operating pressure space pressure, the escape valve is held closed, but, upon decline of supply pressure below the operating pressure space pressure, the escape valve opens to provide for rapid closing of the main valve by the spring means.

2. In a servo-motor for operating a main valve and comprising a main valve operating member, spring means acting on the operating member in a main-valve-closing direction; an operating piston; an operating cylinder for the piston and cooperating with the latter to provide operating pressure and drain spaces at opposite sides thereof with the operating pressure space at the side for pressure therein to move the piston for moving said operating member in a main-valve-opening direction against the spring means; said operating cylinder having a liquid pressure supply space and a valve cylinder communicating with the supply, the operating pressure, and the drain spaces; a first piston valve in the valve cylinder and separating the operating pressure and pressure supply spaces and provided with opposed piston areas subject to supply space and operating pressure space pressures so that the supply pressure normally holds the piston valve in position interrupting communication of the operating pressure and drain spaces and fall in supply pressure in relation to operating pressure space pressure to a predetermined extent is effective to move the piston valve to establish such communication for rapid closing of the main valve; said first piston valve having an orifice connecting the supply pressure and operating pressure spaces, having a coaxial bore opening into the operating pressure space, and having a port connecting the bore and the drain space; a second piston valve in said bore and movable to place the operating pressure and drain spaces in communication through said bore and port and to interrupt such communication; means for transmitting motion from the operating piston to the main valve operating member; follow-up means connecting the main valve operating member and the second piston valve and operative to provide for movement of the latter by the main valve operating member pursuant to movement thereof in response to change in liquid pressure acting on the operating piston until the forces of the spring means and of the operating piston acting on the main valve are balanced; and manual means for adjusting the follow-up means to initiate movement of the second piston valve to change the operating pressure space pressure to move the operating piston and the main operating member with consequent movement by the latter of the second piston valve until the balanced relations of forces acting on the main operating member is restored.

3. In a servo-motor for operating a main valve and comprising a main valve operating member; spring means acting on the operating member in a main-valve-closing direction; an operating piston; an operating cylinder for the piston and cooperating with the latter to provide operating pressure and drain spaces at opposite sides thereof with the operating pressure space at the side for pressure therein to move the piston for movement of the operating member in a main-valve-opening direction against the spring means; said operating cylinder having a liquid pressure supply space and a valve cylinder communicating with the supply, the operating pressure, and the drain spaces; a first piston valve in the valve cylinder and separating the operating pressure and pressure supply spaces and provided with opposed piston areas subject to supply space and operating pressure space pressures so that the supply pressure normally holds the piston valve in position interrupting communication of the operating pressure and drain spaces and fall in supply pressure in relation to operating pressure space pressure to a predetermined extent is effective to move the piston valve to establish such communication for rapid closing of the main valve; said first piston valve having an orifice connecting the supply pressure and operating pressure spaces, having a coaxial bore opening into the operating pressure space, and having a port connecting the bore and the drain space; a second piston valve in said bore and movable to place the operating pressure and drain spaces in communication through said bore and port and to interrupt such communication; a main lever pivotally connected with the operating piston and with the main valve operating member; a fulcrum for the main lever; a follow-up lever pivotally connected with the main lever and with said second piston valve; a fulcrum for the follow-up lever; and manually operable means for varying the position of the last-named fulcrum.

FRANK A. MEYER.

REFERENCES CITED

The following references are of record in the file of this patent:

UNITED STATES PATENTS

| Number | Name | Date |
| --- | --- | --- |
| 813,209 | Holmes | Feb. 20, 1906 |
| 1,199,036 | Hodgkinson | Sept. 19, 1916 |
| 1,231,257 | Herr | June 26, 1917 |
| 1,772,403 | Smott | Aug. 5, 1930 |
| 2,178,864 | Rosenberger | Nov. 7, 1939 |
| 2,225,321 | Schwendner | Dec. 17, 1940 |

FOREIGN PATENTS

| Number | Country | Date |
| --- | --- | --- |
| 233,110 | Germany | Mar. 29, 1911 |
| 276,692 | Germany | July 17, 1914 |